(12) United States Patent
Guilbert et al.

(10) Patent No.: US 6,387,508 B1
(45) Date of Patent: May 14, 2002

(54) METAL BONDING FILM COMPOSITIONS

(75) Inventors: C. Carol Guilbert; David V. Mahoney, both of Austin; Rafael Garcia-Ramirez, Dripping Springs, all of TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/661,673

(22) Filed: Sep. 14, 2000

(51) Int. Cl.$^7$ .......................... B32B 15/08; B32B 27/38; B32B 27/32; B05D 3/02; C08L 63/00

(52) U.S. Cl. .................. 428/418; 428/413; 428/500; 428/523; 427/327; 427/386; 525/107

(58) Field of Search ................................. 428/413, 418, 428/500; 427/386; 525/114, 107

(56) References Cited

U.S. PATENT DOCUMENTS

| | | | |
|---|---|---|---|
| 3,504,103 A | 3/1970 | Anderson et al. ............ | 174/117 |
| 4,345,004 A | 8/1982 | Miyata et al. ............... | 428/416 |
| 4,885,187 A | 12/1989 | Koenig | |
| 5,106,901 A | 4/1992 | Paterson et al. ............. | 524/444 |
| 5,242,980 A * | 9/1993 | Tse .............................. | 525/114 |
| 5,641,827 A | 6/1997 | Chang et al. ................ | 524/431 |

FOREIGN PATENT DOCUMENTS

| | | | | |
|---|---|---|---|---|
| DE | 1 640 778 | 12/1970 | | |
| DE | 197 10 881 A1 | 9/1998 | ............ | H02B/1/20 |
| EP | 0 309 903 | 4/1989 | ............ | C08L/21/00 |
| EP | 0 368 543 | 5/1990 | ............ | B05D/1/32 |
| EP | 0 530 938 A1 | 3/1993 | ............ | B05D/7/14 |
| JP | 82023377 | 5/1982 | ............ | H01B/3/44 |
| JP | 59-134508 | 8/1984 | ........... | H01B/13/16 |
| JP | 11-203944 | 7/1999 | ............ | H01B/7/00 |
| WO | WO 96/25292 | 8/1996 | ........... | B32B/27/08 |
| WO | WO 97/11122 | 3/1997 | | |
| WO | WO 97/13589 | 4/1997 | | |
| WO | WO 98/08906 | 3/1998 | | |
| WO | WO 09/43251 | 10/1998 | ............ | H01B/3/46 |

OTHER PUBLICATIONS

PCT Search Report for PCT/US01/2360.
Society of Plastics Engineers–Technical Paper vol. XV, Gylcidyl Esters–a New Family of Expoxide Resins by David A. Shimp & Norman G. Wolfe, May 5–8, 1969.
12$^{th}$ Electrical/Electronics Insulation Conference–Pracical Application Fluidized Bed Coating Process to Bus Bar Insulation by Y. Kohzu and K. Souma, Tokyo Shibaura Electric Co., Ltd., Tokyo, Japan, Nov. 11–14, 1975.

* cited by examiner

*Primary Examiner*—Robert Dawson
*Assistant Examiner*—Michael J Feely
(74) *Attorney, Agent, or Firm*—Alan Ball; Gary L. Griswold; Gerald F. Chernivec

(57) ABSTRACT

An electrically insulating composition for bonding to metal and method for applying the composition in sheet form. The insulating composition comprises a polyolefin polymer adapted for elevated temperature crosslinking and a co-bonding agent mixed with the polyolefin polymer in an amount up to about 60 parts of tile co-bonding agent to 100 parts of the polyolefin polymer. Preferably, the insulating composition cures in contact with metal pre-heated to elevated temperatures in a range from about 140° C. to about 190° C. to provide a lap-shear bond strength between the electrically insulating composition and a metal substrate of from about 3.3 MPa to about 12 MPa.

27 Claims, No Drawings

METAL BONDING FILM COMPOSITIONS

FIELD OF THE INVENTION

The invention relates to metal-protecting, electrically insulating compositions, films and more particularly to sheet or film material applied to substrates at elevated temperature to provide primary insulation, such as bus bar insulation, on electrical conductors.

BACKGROUND OF THE INVENTION

Bus bars are well known as interconnection structures for use with electricity distribution networks and related switchgear. Portions of a bus bar, along its length, provide sites for electrical connection to bare metal. Other portions of the bar have an overlying protective insulating coating. There is a variety of insulating coatings that may be applied to metal substrates, including e.g. bus bars and electrical current carrying wires, using several alternate methods. Conventional coatings for metal may be curable compositions such as electrically insulating resin coatings including filled polysiloxane compositions, poly(vinylidene fluoride) compositions and epoxy resin compositions. Japanese Patent No. JP 11203944 provides a general description of insulating resin coatings for bus bars. Publications describing curable polysiloxane insulating compositions include published application WO 9843251, U.S. Pat. No. 5,641,827 and French Patent No. FR 2644619 that describes a filled silicone elastomer, wire insulation, cured at 80° C. for 20 min. Poly(vinylidene fluoride) arc resistant compositions may be used to insulate electrical switches as described by Japanese Patent No. JP 57023377. Epoxy resin coatings for metal may be applied from solution as described in Annual Tech. Conf., Soc. Plast. Eng., Tech. Pap., 27th (1969), 15 34–8. Publ. Soc. Plast. Eng., Inc., Stamford, Conn. They may also be electrophoretically deposited on to copper conductors according to JP 59134508, or an epoxy resin coating may be applied to a metal surface by fusion bonding using fluidized bed techniques. Evidence exists for epoxy coating formation using fusion bonding by reference to U.S. Pat. No. 4,885, 187 and Proc. Electr./Electron. Insul. Conf., 12th (1975) 165–70 Publ. IEEE, New York, N.Y., which describes the benefits of powdered epoxy, fusion bonded coatings compared to polyethylene terephthalate tape for protection and insulation of bus bars.

Several other information sources describe the use of tape or film or wrap, for bus bar protection and insulation. For example, German Patent No. DE 19710881, U.S. Pat. No. 3,504,103 and published application WO 96/25292 use adhesive coated wrapping materials for bus bar covers. Tubular covers may also be used for this purpose as described in German Patent No. DE 1640778. In some cases the tubular covers may be heated to a selected temperature at which shrinkage occurs so that the heat-shrink tube establishes more intimate contact with the metal surface. An alternative process for wrapping a metal surface involves the application of a band of felt or cloth to a curable layer of epoxy resin coated on a metal surface. Curing of the epoxy layer then bonds the felt or cloth to the metal.

The use of adhesive coated wrap materials or special preparation of metal surfaces to promote bonding of insulation to the metal represent time consuming and costly processes for protecting and electrically insulating metal substrates. A need exists for an insulating cover composition, sheet or tape that is relatively convenient to manufacture and bonds to metal using a simple method of application that may be readily automated.

SUMMARY OF THE INVENTION

The present invention provides an extrudable, electrically insulating, optionally flame retarding, composition and film possessing latent crosslinking and bonding capability. Extrudable, insulating compositions according to the present invention comprise a crosslinkable polyolefin matrix material containing a co-bonding agent for metal. Prevention of premature crosslinking of either the polyolefin or the co-bonding agent requires care during both the material compounding and film forming stages of manufacture. Compounding and film extrusion require process temperatures below the decomposition temperature of curative materials and below the temperature used to bond an electrically insulating film to a metal substrate. A co-bonding agent typically cures by a thermoset mechanism. Polyolefin crosslinking also proceeds at elevated temperature. Once curing or crosslinking of either compound or film is initiated the process cannot be reversed.

Films of the insulating composition according to the present invention bond to pre-heated metal at a temperature sufficiently elevated to activate the co-bonding agent and promote the crosslinking reaction of the polyolefin polymer. Optionally, the insulating composition may include flame retardants, arc suppressants, extrusion aids and other additives to meet the requirements of specific applications. Preferably, extruded material may be applied as film or tape to bus bars using an automated process.

More particularly, the present invention provides an electrically insulating composition for bonding to metal. The insulating composition comprises a polyolefin polymer adapted for elevated temperature crosslinking and a co-bonding agent. The co-bonding agent may be mixed with the polyolefin polymer in an amount up to about 60 parts of the co-bonding agent to 100 parts of the polyolefin polymer. Preferably, the insulating composition bonds to a metal pre-heated to elevated temperatures from about 140° C. to about 190° C., during crosslinking of the polyolefin and curing of the co-bonding agent. The resulting structure has a lap-shear bond strength between the electrically insulating composition and a metal from about 3.3 MPa to about 12 MPa.

An insulating composition according to the present invention may be applied for bonding to a metal in a variety of material forms. After curing, the insulating composition provides a barrier layer over the metal. The layer is formed preferably by applying the insulating composition in the form of a film or sheet material.

The present invention also includes a method for insulating a metal substrate wherein the metal substrate is first heated to an elevated temperature in a range from about 140° C. to about 190° C. At least one sheet of an electrically insulating composition is applied to the heated metal substrate. Optionally the sheet extends over the edges of the metal substrate for formation of an overlapped seam. The electrically insulating composition comprises a polyolefin polymer suitable for elevated temperature crosslinking, and a co-bonding agent mixed with the polyolefin polymer in an amount up to about 60 parts of the co-bonding agent to 100 parts of the polyolefin polymer. The electrically insulating composition cures in contact with the metal substrate at the elevated temperature to provide a lap-shear bond strength between the electrically insulating composition and the metal substrate of from about 3.3 MPa to about 12 MPa. Application of pressure to the sheet causes it to conform to the contours of at least a portion of the metal substrate. This provides an insulation-protected metal substrate which undergoes thermal conditioning to further bond the sheet to the metal substrate during crosslinking of the polyolefin and curing of the co-bonding agent.

Overlapping for seam formation with a single sheet or between multiple electrically insulating sheets represents one method for insulating electrically conducting substrates. Use of this method ensures full coverage of the conductor by the insulating composition. An alternative method produces conducting substrates covered by sheets of insulating material having seams in an abutting relationship. In this case, the process requires precise application of sheet material to produce insulated substrates without gaps in the vicinity of the abutted seams.

DETAILED DESCRIPTION OF THE INVENTION

Compositions and films according to the present invention comprise a polyolefin material, preferably a mixture of low density polyethylene and a maleated polyethylene, containing a co-bonding material for metal that is preferably an epoxy containing material. Both the polyolefin material and the epoxy co-bonding agent have constituents possessing latent reactivity that is observable at elevated temperature.

The benefits of latent reactivity for bonding insulating compositions to metal surfaces according to the present invention also present potential problems during compounding and film forming of insulating materials. Prevention of premature curing of either the polyolefin or the epoxy co-bonding agent requires care during both the material compounding and film forming stages of the manufacturing process. A reactive epoxy typically cures by a thermoset mechanism. Polyolefin crosslinking also proceeds at elevated temperature. Once curing or crosslinking is initiated the process cannot be reversed. Preferably the blending of materials uses a batch process to provide compositions according to the present invention suitable for pelletizing and feeding into a single screw extruder prior to producing sheets of electrically insulating film. The batch process occurs in two stages to achieve suitable dispersion of particulate materials. The first stage of compounding includes all of the materials except the polymer crosslinking agent. Preferably a mixture of the co-bonding agent and its curing agent is added to the batch as a pre-blend. Also, the curing agent for the reactive co-bonding agent may be sensitive to the presence of moisture and the polymer crosslinker may be pH-sensitive, requiring careful selection of other additives such as fillers, flame retardants, synergists and the like. Other manufacturing processes may involve compounding and sheet extrusion using a twin-screw extruder.

Interfacial contact between a metal substrate and an insulating sheet promotes bond formation between the metal and sheet at a temperature that causes the insulating composition to cure. Proper application of the sheet produces a protective, electrically insulating, and optionally flame-retardant polymeric layer that is firmly attached to a metal substrate. The temperature used for application of electrically insulating sheets according to the present invention is relatively low compared to operating temperatures for commonly used fluidized bed application of fusion bonded powder epoxy coatings. Lower temperature application is beneficial for bond formation to low melting metals such as tin-plated layers applied to aluminum bars. While the application of fusion bonded epoxy coatings may damage such bars, sheets according to the present invention may be effectively bonded without concern.

Substrates that have been tested include steel, copper, aluminum, tin-plated aluminum, silver plated (flashed) copper, polished stainless steel, and grit-blasted steel.

Suitable crosslinking polyolefins include low density polyethylene, maleated polyethylene, ethylene-octene copolymers, ethylene-hexene copolymers, ethylene-propylene copolymers, ethylene-vinyl acetate copolymers, ethylene-acrylate copolymers and blends thereof with polyethylene.

Suitable co-bonding agents include epoxy resins such as liquid and solid bisphenol A epoxy resins, epoxy cresol novolacs (ECN), epoxy phenol novolacs (EPN) and blends of ECN or EPN with bisphenol A epoxy resins. Other useful co-bonding agents include compounded fusion bonded epoxy products such as Scotchcast 413 (available from 3M Co., St. Paul, Minn.), bisphenol F epoxy resins, aliphatic epoxy resins and the like.

Suitable epoxy crosslinking agents include complex compounds of boron trifluoride, dicyandiamide, also known as cyanoguanidine, polyamides, polyamines and other similarly effective, known materials.

Suitable flame retardants include brominated flame retardants including ethylenebistetrabromophthalimlde, decabromodiphenyl oxide, SAYTEX 8010 (available from Albemarle Corp.), tetradecabromodiphenoxybenzene, and a flame synergist including antimony trioxide, antimony pentoxide, zinc borate, FIREBRAKE ZB (available from U.S. Borax), or chlorinated flame retardants such as DECLORANE PLUS (available from Occidental Chemical Corp.).

Crosslinkers for olefinic unsaturation include dicumyl peroxide, alpha,alpha'-bis(t-butyl peroxy) diisopropylbenzene, available from Hercules Inc. as VULCUP, or mixtures of dicumyl peroxide, alpha,alpha'-bis(t-butyl peroxy)diisopropylbenzene, and t-butyl cumyl peroxide, 2,5-dimethyl-2,5-di(t-butylperoxy)hexane, and 2,5-dimethyl-2,5-di(t-butylperoxy)hexyne-3.

Other suitable additives include antioxidants, processing aids, waxes, UV stabilizers, arc suppressants, and drip suppressants such as alumina, silane-treated talc, mica, feldspar, and wollastonite.

The invention also includes a method for applying sheets having latent reactivity that were produced using film formed from compositions according to the present invention. Preferably, the method includes a pre-heating step to raise the temperature of the metal substrate above the reaction temperature of the film so as to activate the co-bonding agent, cause the polymer to crosslink, and bond the film to the metal.

Surface protection and electrical insulation of the previously heated metal occurs by applying sheets of film, according to the present invention, so that a strip of the film extends over and beyond the edges of the metal substrate to allow formation of an overlapped seam. A butted seam may also be used provided there are no gaps between sheets of film where electrical shorts could occur. Film application may be automated using an apparatus to feed metal structures, such as bus bars, towards laminating rollers. Impingement of hot air or induction heating may be used to preheat the metal in a range of about 140° C. to about 190° C., preferably about to about 150° C. before feeding the metal past laminating rollers to bond protective sheets to the major surfaces of the metal. Just behind the laminating rollers high-velocity jets of heated air deflect overlapping portions of the film to wrap around and cover edges and other exposed parts of the metal structure. Using a metal bus bar, for example, first one side of the bar may be coated before the other side of the bar is coated. With suitable design, automated laminating apparatus may be equipped to apply, overlap and bond protective layers in a single operation. The process of applying protective, electrically insulating film to metal structures includes thermal conditioning at elevated temperature for about 20 minutes to fully cure and bond the protective layer before cooling the protected metal to ambient temperature. Upon completion of the process, the properties of the protective layer give it the appearance of a uniform coating having thickened seams at edges where film overlap occurred. Bonded films typically exhibit adhesion values from about 3.3 MPa to about 12 MPa measured by conventional lap shear techniques using Instron testing equipment operating with a jaw separation speed of 2.5 mm/min.

Extruded films according to the present invention may be used for protection and insulation of a wide range of metal structures. The abrasion resistant character of the material makes it useful as a protective covering for a variety of applications. Of particular interest are the properties that relate to application of the material as an electrically insulating layer on metallic substrates particularly for insulating electric bus bars. When applied to a bus bar substrate, including tin-plated aluminum or silver-flashed copper, sheets according to the present invention provide a strongly bonded, electrical insulating layer. An advantage of using sheets having latent reactivity, instead of fusion bonded epoxy powders, is the opportunity to use an application temperature below the softening point of tin when using tin-plated aluminum bus bars. This significantly reduces the risk of damage to thin layers of metal plating and represents an operational advantage over the use of fluidized bed coating techniques.

A composition and film useful for bonding to metal substrates to provide a protective, electrically insulating cover have been described according to the present invention. Those of skill in the art will appreciate that, in light of the present disclosure, changes may be made to the embodiments disclosed herein without departing from the spirit and scope of the invention which is defined in the appended claims and further described by the following examples.

EXPERIMENTAL

Material Formulations

Table 1 and Table 2 show material formulations and associated lap shear results according to the present invention.

Flame Retardancy and Tracking

Flame retardant containing sheets, according to the present invention, exhibit a UL-94 V-0 to V-2 rating (ASTM D 3801) and a "Comparative Tracking Index" rating of Group 1 as measured using IEC 112 test method.

Dielectric Strength

The dielectric strength properties, for materials according to the present invention, remain unchanged following exposure to humidity conditions of 96% relative humidity for 96 hours at 23° C. Material property measurement shows retention of at least 50% of dielectric strength for formulations aged for varying time periods including 7 days at 163° C.; 7 days at 190° C.; 60 days at 138° C.; and 60 days at 162° C.

Tensile Strength

Materials according to the present invention retain at least 50% of their initial tensile strength after aging for various time periods including 7 days at 163° C.; 7 days at 190° C.; 60 days at 138° C.; and 60 days at 162° C.

Latent Reactivity Retention

Sheets of extruded film retain from about 90% to about 95% of their latent reactivity for no less than 1 year when stored under room temperature conditions of 25° C. and 50% relative humidity as indicated by accelerated aging for two weeks at 50° C.

Components of the insulating composition influence adhesion to metal. Varying polyolefin as in Examples C1 and 1–5 has an effect on lap shear value. Similarly, lap shear variation results from a change of co-bonding agent in the presence of a common low density polyethylene, as in Examples 6–8. This indicates how an epoxy group containing co-bonding agent increases bond strength to metal in some cases. Also, adhesion to metals of compositions according to the present invention may vary with selection of a curative material as shown by comparison of Example 1 with Example 11. The use of VULCUP in Example 11, as an alternative to dicumyl peroxide, appears to lower the lap-shear value.

TABLE 1

MATERIAL FORMULATIONS - EXAMPLES C1 AND 1–5

| Material | Example C1 | Example 1 | Example 2 | Example 3 | Example 4 | Example 5 |
|---|---|---|---|---|---|---|
| DYNH-1 | | 100 | | | 55 | 55 |
| Exxon LD-400 | | | 100 | | | |
| EXXACT 2M042 | 100 | | | | | |
| ENGAGE 8003 | | | | 100 | | |
| ENGAGE 8480 | | | | | 45 | |
| ELVAX 470 | | | | | | 45 |
| Maleated Wax | 5 | 5 | 5 | 5 | 5 | 5 |
| Flame Retardant | 34 | 34 | 34 | 34 | 34 | 34 |
| Synergist | 5.7 | 5.7 | 5.7 | 5.7 | 5.7 | 5.7 |
| Drip Suppressant A | 18.3 | 17.0 | 18.0 | 18.0 | 18.0 | 18.0 |
| Drip Suppressant B | | | | | | |
| EPON 828 | 5 | 5 | 5 | 5 | 5 | 5 |
| EPON 1001 F | | | | | | |
| ECN 1280 | | | | | | |
| SCOTCHCAST 413 | | | | | | |
| EPON 2002 | | | | | | |
| BF$_3$ Catalyst | 0.15 | 0.15 | 0.15 | 0.15 | 0.15 | 0.15 |
| Dicyandiamide | | | | | | |
| Dicumyl Peroxide | 1.5 | 2.0 | 2.0 | 2.0 | 2.0 | 2.0 |
| VULCUP | | | | | | |

TABLE 1-continued

MATERIAL FORMULATIONS - EXAMPLES C1 AND 1–5

| Material | Example C1 | Example 1 | Example 2 | Example 3 | Example 4 | Example 5 |
|---|---|---|---|---|---|---|
| Antioxidant | 0.2 | 0.5 | 0.5 | 0.5 | 0.5 | 0.5 |
| Lap Shear* (Mpa) | 2.1 | 5.3 | 4.6 | 3.4 | 5.9 | 5.3 |

*Lap shear measurements were tested against polished stainless steel using Instron testing equipment operating with a jaw separation speed of 2.5 mm/min

TABLE 2

MATERIAL FORMULATIONS - EXAMPLES 6–11

| Material | Example 6 | Example 7 | Example 8 | Example 9 | Example 10 | Example 11 |
|---|---|---|---|---|---|---|
| DYNH-1 | 100 | 100 | 100 | 55 | 55 | 100 |
| Exxon LD-400 | | | | | | |
| EXXACT 2M042 | | | | 45 | 45 | |
| ENGAGE 8003 | | | | | | |
| ENGAGE 8480 | | | | | | |
| ELVAX 470 | | | | | | |
| Maleated Wax | 5 | 5 | 5 | 5 | 5 | 5 |
| Flame Retardant | 34 | 34 | 34 | 34 | 34 | 34 |
| Synergist | 5.7 | 5.7 | 5.7 | 5.7 | 5.7 | 5.7 |
| Drip Suppressant A | 18.0 | 18.3 | 18.3 | 30 | | 17.0 |
| Drip Suppressant B | | | | | 30 | |
| EPON 828 | | | | 5 | 5 | 5 |
| EPON 1001F | 5 | | | | | |
| ECN 1280 | | 5 | | | | |
| SCOTCHCAST 413 | | | 50 | | | |
| EPON 2002 | | | | 42 | 60 | |
| $BF_3$ Catalyst | 0.15 | | | 1.41 | 1.95 | 0.15 |
| Dicyandiamide | | 0.15 | | | | |
| Dicumyl Peroxide | 2.0 | 2.0 | 2.0 | 2.0 | 2.0 | |
| VULCUP | | | | | | 2.0 |
| Antioxidant | 0.5 | 0.2 | 0.2 | 0.5 | 0.5 | 0.5 |
| Lap Shear (MPa) | 6.6 | 7.7 | 3.7 | 5.1 | 7.0 | 4.1 |

Key to Materials

DYNH-1 is a low density polyethylene (d=0.918) melting at 109° C. and available from Union Carbide Chemicals and Plastics Co., Inc.

LD-400 is a low density polyethylene (d=0.917) melting at 108° C. and available from Exxon Chemical Company.

EXXACT 2M042 is an ethylene-octene copolymer having a density of 0.882, melting at 66° C. and available from Exxon Chemical Company.

ENGAGE 8003 is an ethylene-octene copolymer having a density of 0.885, melting at 76° C. and available from DuPont Dow Elastomers.

ENGAGE 8480 is an ethylene-octene copolymer having a density of 0.902, melting at 100° C. and available from DuPont Dow Elastomers.

ELVAX 470 is an ethylene vinyl acetate copolymer having a density of 0.941, melting at 89° C. and available from DuPont Dow Elastomers.

Maleated polyethylene wax is EPOLENE C-18 available from Eastman Chemicals Co.

Flame retardant is a brominated flame retardant (SAYTEX BT-93) available from Albemarle Corp.

Drip suppressant A is alumina.

Drip suppressant B is silanated talc (MISTRON PLX) supplied by Luzenac America, Lac.

EPON 1001F is a solid epoxy available from Shell Chemical Company.

EPON 828 is a liquid epoxy available from Shell Chemical Company.

ARALDITE ECN 1280 is a solid epoxy cresol novolac available from Ciba Specialty Chemicals Corp.

SCOTCHCAST 413 is a powdered epoxy available from 3M Company, St. Paul, Minn. $BF_3$ catalyst is LEECURE B-550, an epoxy curative supplied by Leepoxy Plastics, Inc. Dicumyl Peroxide (DI-CUP) is an olefin crosslinker available from Hercules, Inc. Dicyandiamide is an epoxy curative available from SKW Trostberg AG.

Antioxidant (IRGANOX 1035) is available from Ciba Specialty Chemicals Corporation. VULCUP is alpha,alpha'-bis(t-butyl peroxy)diisopropylbenzene, from Hercules, Inc.

What is claimed is:

1. An electrically insulating composition for bonding to a metal substrate, said insulating composition comprising:

a polyolefin polymer adapted for elevated temperature crosslinking; and a co-bonding agent mixed wit said polyolefin polymer in an amount up to about 60 parts of said co-bonding agent to 100 parts of said polyolefin polymer, said insulating composition being capable of forming a bond to a heated metal substrate of from about 140° C. to about 190° C. wherein said bond between said electrically insulating composition and the metal substrate comprises a lap-shear bond strength of from about 3.3 MPa to about 12 MPa.

2. An electrically insulating composition according to claim 1 wherein said polyolefin polymer is selected from the group consisting of low density polyethylene, ethylene-octene copolymers, ethylene vinyl acetate copolymers, and mixtures and blends thereof.

3. An electrically insulating composition according to claim 2 further containing from about 2.5 parts to about 10 parts of a maleated polyethylene wax to 100 parts of said polyolefin polymer.

4. An electrically insulating composition according to claim 3 further including from about 20 parts to about 40 parts of a flame retardant to 100 parts of said polyolefin polymer.

5. An electrically insulating composition according to claim 1 wherein said co-bonding agent is an epoxy resin.

6. An electrically insulating composition according to claim 5 wherein said epoxy resin is selected from the group consisting of liquid and solid bisphenol A epoxy resins, epoxy cresol novolacs, epoxy phenol novolacs and mixtures and blends thereof.

7. An electrically insulating sheet comprising:
   a polyolefin polymer adapted for elevated temperature crosslinking; and
   a co-bonding agent mixed with said polyolefin polymer in an amount up to about 60 parts of said co-bonding agent to 100 parts of said polyolefin polymer, said insulating sheet being capable of forming a bond to a heated metal substrate of from about 140° C. to about 190° C. wherein said bond between said electrically insulating sheet and the metal substrate comprises a lap-shear bond strength of from about 3.3 MPa to about 12 MPa.

8. An electrically insulating sheet according to claim 7 wherein said polyolefin polymer is selected from the group consisting of low density polyethylene, ethylene-octene copolymers, ethylene vinyl acetate copolymers, and mixtures and blends thereof.

9. An electrically insulating sheet according to claim 8 further containing from about 2.5 parts to about 10 parts of a maleated polyethylene wax to 100 parts of said polyolefin polymer.

10. An electrically insulating sheet according to claim 9 further including from about 20 parts to about 40 parts of a flame retardant to 100 parts of said polyolefin polymer.

11. An electrically insulating sheet according to claim 7 wherein said co-bonding agent is an epoxy resin.

12. An electrically insulating sheet according to claim 11 wherein said epoxy resin is selected from the group consisting of liquid and solid bisphenol A epoxy resins, epoxy cresol novolacs, epoxy phenol novolacs and mixtures and blends thereof.

13. A method for insulating a metal substrate comprising the steps of:
   heating said metal substrate to an elevated temperature from about 140° C. to about 190° C. to provide a heated metal substrate;
   subsequently applying at least one sheet of an electrically insulating composition to said heated metal substrate to provide an insulation-protected metal substrate, said electrically insulating composition comprising:
      a polyolefin polymer adapted for elevated temperature crosslinking; and
      a co-bonding agent mixed with said polyolefin polymer in an amount up to about 60 parts of said co-bonding agent to 100 parts of said polyolefin polymer; and
   thermally conditioning said insulation-protected metal substrate to bond said at least one sheet to said heated metal substrate to provide a lap-shear bond strength between said electrically insulating composition and said metal substrate of from about 3.3 MPa to about 12 MPa.

14. A method for insulating a metal substrate according to claim 13 wherein said applying at least one sheet includes applying at least a first and second sheet having a seam therebetween.

15. A method for insulating a metal substrate according to claim 14 wherein said seam is an overlapped seam.

16. A method for insulating a metal substrate according to claim 14 wherein said seam is a butted seam.

17. A method for insulating a metal substrate according to claim 13, further including the step of applying pressure to a said sheet to conform said at least one sheet to contours of at least a portion of said heated metal substrate.

18. A method for insulating a metal substrate according to claim 13 wherein said metal substrate is in the form of a bus bar.

19. An electrically insulating composition for bonding to a metal substrate, said insulating composition comprising:
   a polyolefin polymer adapted for elevated temperature crosslinking;
   a maleated polyethylene wax in an amount from about 2.5 parts to about 10 parts of said maleated polyethylene wax to 100 parts of said polyolefin polymer; and
   a co-bonding a part mixed with said polyolefin polymer in an amount up to about 60 parts of said co-bonding agent to 100 part of said polyolefin polymer, said insulating composition being capable of forming a bond to a heated metal substrate of from about 140° C. to about 190° C., wherein said bond between said electrically insulating composition and the metal substrate comprises a lap shear bond strength of from about 3.3 MPa to about 12 MPa.

20. An electrically insulating composition according to claim 19, further including from about 20 parts to about 40 parts of a flame retardant to 100 parts of said polyolefin polymer.

21. An electrically insulating sheet comprising:
   a polyolefin polymer adapted for elevated temperature crosslinking;
   a maleated polyethylene wax in an amount from about 2.5 parts to about 10 parts of said maleated polyethylene wax to 100 parts of said polyolefin polymer; and a co-bonding agent mixed with said polyolefin polymer in an amount up to about 60 parts of said co-bonding agent to 100 parts of said polyolefin polymer, said electrically insulating sheet being capable of forming a bond to a heated metal substrate of from about 140° C. to about 190° C., wherein said bond between said electrically insulating sheet and the metal substrate comprises a lap shear bond strength of from about 3.3 MPa to about 12 MPa.

22. An electrically insulating sheet according to claim 21, further including from about 20 parts to about 40 parts of a flame retardant to 100 parts of said, polyolefin polymer.

23. A method for insulating a metal substrate comprising the steps of:
   beating said metal substrate to an elevated temperature from about 140° C. to about 190° C. to provide a heated metal substrate;
   subsequently applying at least one sheet of an electrically insulating composition to said heated metal substrate to provide an insulation-protected metal substrate, said electrically insulating composition comprising:
      a polyolefin polymer adapted for elevated temperature crosslinking;
      a maleated polyethylene wax in an amount from about 2.5 parts to about 10 parts of said maleated polyethylene wax to 100 parts of said polyolefin polymer; and a co-bonding agent mixed with said polyolefin polymer in an amount up to about 60 parts of said co-bonding agent to 100 parts of said polyolefin polymer; and thermally conditioning said insulation-protected metal substrate to bond said at least one sheet to said heated metal substrate to provide a lap-shear bond strength between said electrically insulating composition and said metal substrate of from about 3.3 MPa to about 12 MPa.

24. A method for insulating a metal substrate according to claim 23, wherein said subsequently applying at least one sheet includes at least a first sheet and at least a second sheet having a seam therebetween.

25. A method for insulating a metal substrate according to claim 24, wherein said seam is an overlapped seam.

26. A method for insulating a metal substrate according to claim 24, wherein said seam is a butted seam.

27. A method for insulating a metal substrate according to claim 23, wherein said metal substrate is in the form of a bus bar.

* * * * *

UNITED STATES PATENT AND TRADEMARK OFFICE
CERTIFICATE OF CORRECTION

PATENT NO. : 6,387,508 B1
DATED : May 14, 2002
INVENTOR(S) : Guilbert, C. Carol

It is certified that error appears in the above-identified patent and that said Letters Patent is hereby corrected as shown below:

Title page,
Item [57], ABSTRACT,
Line 6, "tile" should read -- the --.

Column 4,
Line 24, "ethylenebistetrabromophthalmlde" should read
-- ethylenebistetrabromophthalimide --.

Column 5,
Line 12, "whore" should read -- where --.

Column 7,
Line 63, "Lac." should read -- Inc. --.

Column 8,
Line 57, "wit" should read -- with --.

Signed and Sealed this

Fourteenth Day of January, 2003

JAMES E. ROGAN
*Director of the United States Patent and Trademark Office*